United States Patent Office 3,152,860 Patented Oct. 13, 1964

3,152,860
PROCESS FOR THE COLORATION OF CELLULOSE TEXTILE MATERIALS WITH WATER-SOLUBLE REACTIVE DYESTUFFS
Gerald Booth and Donald Pryce Hudson, Manchester, England, assignors to Imperial Chemical Industries Limited, London, England, a corporation of Great Britain
No Drawing. Original application Oct. 27, 1958, Ser. No. 769,537, now Patent No. 3,084,166, dated Apr. 2, 1963. Divided and this application Dec. 29, 1961, Ser. No. 163,072
3 Claims. (Cl. 8—54.2)

This invention relates to new water-soluble coloring matters and more particularly it relates to new water-soluble coloring matters containing substituted sulphamyl groups and at least one sulphonic acid or carboxylic acid group being valuable for the production of colorations on textile materials having excellent fastness to wet treatments such as washing treatments. This application is a divisional application of our previous application, Serial No. 769,537, filed October 27, 1958, and now United States Patent 3,084,166.

We have found that the introduction of a gamma-halogeno-beta-hydroxypropyl-sulphamyl group into the molecule of a water-soluble dyestuff causes a marked increase in the fastness of the colorations obtained as compared with those from the original dyestuff especially the fastness to washing.

Thus the introduction of the said group appears to convert the original dyestuff from a direct or acid dyestuff, as the case may be, into a "reactive" dyestuff, that is to say, a dyestuff capable, under suitable dyeing or printing conditions, of chemically reacting with the textile material to give colorations having an excellent fastness to washing.

The effect also extends to simple benzene and naphthalene derivatives so that colorless compounds containing, for example, diazotisable amino groups, aromatic hydroxyl groups or ketonic enolizable groups and also containing a group as defined above may also be attached to the textile material and converted in situ to a dyestuff.

Thus, according to the present invention there are provided new water-soluble coloring matters containing at least one sulphamyl group in which the nitrogen atom carries at least one substituent of the formula:

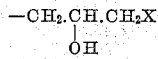

wherein X stands for a halogen atom selected from chlorine and bromine, said coloring matters also containing at least one solubilizing group selected from sulphonic acid and carboxylic acid groups.

The coloring matters containing the said sulphamyl group may be dyestuffs of any of the known series, especially valuable being those of the azo, anthraquinone, and, above all, the phthalocyanine series.

The new water-soluble coloring matters are valuable for the coloration of protein fibres such as wool and silk, and synthetic fibres such as nylon and polyacrylonitrile which may be dyed in similar manner to wool, and for these fibres the new water-soluble coloring matters may be applied by the commonly-used dyeing and printing methods for such fibers, for example by dyeing from hot neutral or weakly acid baths, to give shades having good fastness to wet treatments. Preferably, however, the new water-soluble coloring matters are used for the coloration of cellulose fibers such as cotton, viscose, rayon and linen the coloration being effected by carrying out the treatment with the coloring matter in conjunction with a treatment with an alkali such as caustic soda or sodium carbonate.

The new coloring matters may be obtained by a number of methods and in general any method commonly used for the introduction of a substituted sulphamyl group may be used. A method of great utility especially for the new coloring matters of the anthraquinone and phthalocyanine series comprises treating a dyestuff containing at least 2 and preferably 4 sulphonchloride groups with a primary or secondary amine containing at least one 3-chloro-2-hydroxy propyl or 3-bromo-2-hydroxypropyl group attached to the nitrogen atom under such conditions that at least one of the sulphonchloride groups is converted to the correspondingly substituted sulphamyl group and at least one of the sulphonchloride groups is hydrolyzed to a sulphonic acid group so that the resultant dyestuff contains from 1 to 3 sulphonic acid groups and from 3 to 1 sulphamyl groups substituted as defined above.

Suitable dyestuffs containing sulphonchloride groups are, for example, the phthalocyanine sulphonchlorides described in United Kingdom specification No. 515,637 and anthraquinones similar to those described in United Kingdom specification No. 712,771, but containing more than 2 sulphonchloride groups.

Suitable amines include, for example, 3-chloro-2-hydroxypropylamine, 3-bromo-2-hydroxypropylamine, and 4-methyl-N-(3'-chloro-2'-hydroxy)propylaniline.

In the above process, the dyestuff may be treated with the amine in an anhydrous medium using such proportions that there is less amine present than the theoretical amount necessary to react with all the sulphonchloride groups present, thereafter hydrolysing the residual sulphonchloride groups, for example by treatment with a dilute aqueous solution of a mild alkali such as sodium carbonate. It is preferred however to react together the dyestuff and the amine in a cold aqueous medium, preferably in the presence of a mild alkali such as sodium carbonate or sodium bicarbonate.

Under such conditions part of the sulphonchloride groups is converted to the required substituted sulphamyl groups whilst others are hydrolyzed to sulphonic acid groups.

The new coloring matters may also in many cases be synthesized from simpler molecules already containing the gamma - halogeno - beta - hydroxypropyl-sulphamyl grouping of the general methods commonly used for synthesis of dyestuffs.

Thus, anilines, aminophenols, naphthylamines and aminonaphthols containing the gamma-chloro (or bromo) beta-hydroxypropylsulphamyl groups may be obtained by reduction of the corresponding nitroaryl-sulphoramides or by the hydrolysis of the corresponding acetamidoaryl-sulphonamides, and these and naphthols, phenols and pyra olones containing such groups may be used as diazo components and/or coupling components in the conventinal coupling reaction for synthesis of a wide variety of azo or polyazo dyestuffs. Where the dyestuffs so obtained contain groups capable of forming metal complexes; e.g. o:o'-dihydroxyazo groups or o-hydroxycarboxy groups as in present e.g. in salicylic acid radicals, they may be treated with an agent yielding metal, e.g. an agent yielding chromium, nickel, cobalt or copper to form the corresponding metal complex derivative.

The invention is illustrated but not limited by the following examples in which parts are by weight.

EXAMPLE 1

11.5 parts of copper phthalocyanine are heated in 120 parts of chlorosulphonic acid at 138° C. for 4 hours, then the solution is cooled and drowned into ice and water. The precipitate, which consists substantially of copper phthalocyanine tetra-(3')-sulphonchloride, is filtered off, suspended in 200 parts of water cooled to below 5° C.

and the pH of the mixture is brought to 7 by adding sodium carbonate.

6 parts of 3-chloro-2-hydroxypropylamine hydrochloride and 13.5 parts of sodium bicarbonate are then added and the mixture is stirred at below 5° C., for 5 hours and then at 20° C. for 12 hours. Sodium chloride is then added at the rate of 50 grams for each liter and the precipitated material is filtered off and dried.

The product so obtained is a dark blue powder which is readily soluble in water. The analytical figures obtained on analysis of the product correspond closely to those calculated for disodium copper phthalocyanine-di-(sulphon - gamma - chloro-beta-hydroxypropylamide)-disulphonate.

The product colors cellulosic textile materials in greenish blue shades very fast to washing when applied in conjunction with an alkali. A number of suitable recipes are given below:

Recipe 1

100 parts of cotton fabric are padded in a 2% aqueous solution of the dyestuff and squeezed until the weight of the fabric is 200 parts. The fabric is dried, padded in an aqueous solution containing 1% of caustic soda and 30% of sodium chloride, and again squeezed until its weight is 200 parts.

The fabric is then steamed for 1 minute at 100° C., then rinsed in water, boiled in a dilute soap solution for five minutes, rinsed again in water and dried.

Recipe 2

The fabric is padded at 50° C. in dyestuff solution containing 0.2% of a highly sulphonated oil, 2% of sodium sulphate and 2% of sodium carbonate. The fabric is dried at 110° C., then steamed for 5 minutes and rinsed, soaped, rinsed and dried as described in Recipe 1.

Recipe 3

The fabric is dyed at 85° C. for 30 minutes in a dyestuff solution containing 3% of sodium chloride. 0.2% of caustic soda is then added and the dyeing is continued for 45 minutes. The fabric is then rinsed, soaped, rinsed and dried as described in Recipe 1.

Recipe 4

A printing paste is made by mixing together 2 parts of the dyestuff, 5 parts of urea, 40 parts of a 5% aqueous solution of sodium alginate, 52 parts of water and 1 part of sodium bicarbonate.

The printing paste is applied to cotton fabric by roller and the treated fabric is dried and then steamed for 5 minutes. The fabric is then rinsed, soaped, rinsed and dried as described in Recipe 1.

EXAMPLE 2

6 parts of 4-aminobenzene sulphon-N-gamma-chlorobeta-hydroxypropylamide hydrochloride are dissolved in 80 parts of water and 2 parts of aqueous hydrochloric acid of specific gravity 1.16 at 5° C. A solution of 1.4 parts of sodium nitrite in 10 parts of water is added during 10 minutes. The diazo compound so obtained is added to a solution, cooled to 5° C., of 8.1 parts of the disodium salt of 1 - acetylamino - 8 - hydroxynaphthalene-3:6-disulphonic acid and 3.2 parts of sodium bicarbonate in 50 parts of water. The mixture is stirred for 3 hours at 5° C. and sodium chloride is then added at the rate of 200 grams for each liter and the precipitated dyestuff is filtered off and dried. It is obtained in the form of a red powder which dissolves readily in water to give a red solution. The organically combined chlorine content of the product corresponds to 0.95 atom of chlorine per azo link. The product colors cellulosic textile materials in red shades very fast to washing when applied in conjunction with an alkali.

OTHER DYES FROM DIAZOTIZED 4-AMINOBENZENE SULPHA - N - GAMMA - CHLORO-BETA-HYDROXYPROPYLAMIDE

| Coupling component | Combined chlorine per azo link, atoms | Shade |
|---|---|---|
| 1-(4'-sulphophenyl)-3-methyl-5-pyrazolone | 0.975 | Yellow. |
| 2-amino-8-hydroxynaphthalene-6-sulphonic acid (acid coupled). | 1.01 | Red. |

The 4-aminobenzene sulphon-N-(gamma-chloro-beta-hydroxypropyl)amide hydrochloride used in the above example may be obtained as follows:

47 parts of acetanilide-4-sulphonyl chloride are dissolved in 480 parts of acetone and 320 parts of water and the solution is stirred at below 5° C. 32 parts of 3-chloro-2-hydroxypropylamine hydrochloride and 33.6 parts of sodium bicarbonate are then added and the mixture is stirred at below 5° C. for 4 hours. The bulk of the acetone is removed by evaporation at from 20 to 30° C. and the precipitated oil gradually solidifies to give 4-acetamidobenzene - sulphon - N - (gamma - chloro - beta - hydroxypropyl)amide, which when recrystallised from a mixture of benzene and ethyl acetate melts at 136° C.

45.5 parts of 4-acetamidobenzene-sulphon-N-(gamma-chloro-beta-hydroxypropyl)-amide are stirred with 160 parts of 15% hydrochloric acid for 4 hours at 80° C. The resultant solution is filtered and stirred at below 10° C. and basified by the gradual addition of 67.5 parts of 32% sodium hydroxide solution followed by 120 parts of 2 N sodium carbonate solution. The separated oil is extracted with 180 parts of ethyl acetate and hydrochloric acid gas is passed into the cooled ethyl acetate solution until no further precipitate is formed. The precipitate is filtered off, washed with ethyl acetate and dried. The product consists of 4 - aminobenzene - sulphon-N-(gamma-chloro-beta-hydroxypropyl)amide hydrochloride of melting point 200° C.

EXAMPLE 3

6 parts of 3-aminobenzene-sulphon-N-gamma-chloro-beta-hydroxypropylamide hydrochloride are dissolved in 60 parts of water and 2 parts of aqueous hydrochloric acid of specific gravity 1.16 at 5° C. A solution of 1.4 parts of sodium nitrite in 10 parts of water is added during 10 minutes. The mixture is stirred for 5 minutes and excess nitrous acid is removed with sulphamic acid. The diazo compound so obtained is added to a suspension, cooled to 5° C., of 4.78 parts of 2-amino-8-hydroxynaphthalene-6-sulphonic acid in 60 parts of water. The mixture is stirred for 20 hours at 5° C. and 5 parts of sodium bicarbonate are added and then sodium chloride is added at the rate of 100 grams for each liter of mixture. The precipitated dyestuff is filtered off and dried. It is obtained in the form of a dark red powder which dissolves readily in water to give a red solution. The organically combined chlorine content of the product corresponds to 0.975 atom of chlorine per azo link. The product colors cellulosic textile materials in red shades very fast to washing when applied in conjunction with an alkali.

OTHER DYES FROM DIAZOTIZED 3-AMINOBENZENE-SULPHON - N - GAMMA-CHLORO-BETA-HYDROXYPROPYLAMIDE

| Coupling component | Combined chlorine per azo link, atoms | Shade |
|---|---|---|
| 1-acetylamino-5-hydroxy-naphthalene-3:6-disulphonic acid. | 0.98 | Red. |
| 1-(4'-sulphophenyl)-3-methyl-5-pyrazolone | 0.95 | Yellow. |

The 3 - aminobenzene-sulphon-N-(gamma-chloro-beta-hydroxypropyl)amide hydrochloride, used in this example may be obtained by replacing the 47 parts of acetanilide- 4-sulphonyl chloride used in Example 2 by 44.3 parts of nitrobenzene-3-sulphonyl chloride. There is obtained, in place of the 4-acetamidobenzene-sulphon-N-(gamma-chloro-beta-hydroxypropyl)amide, 3-nitrobenzene-sulphon-N-(gamma-chloro-beta-hydroxypropyl)amide which, when recrystallised from a mixture of ethyl acetate and carbon tetrachloride, melts at 88° C.

20 parts of the 3-nitrobenzene-sulphon-N-(gamma-chloro-beta-hydroxypropyl)-amide are dissolved in 280 parts of ethyl alcohol and 2 parts of finely divided nickel are the added. The mixture is then heated for 8 hours at 40° C. in an autoclave with hydrogen at 100 atmospheres pressure, and cooled. The suspended nickel is removed by filtration and the resulting alcoholic solution evaporated to dryness under vacuum. The residue is dissolved in 180 parts of ethyl acetate and hydrochloric acid gas is passed into the cooled solution until no further precipitate is formed. The precipitate is filtered off, washed with ethyl acetate and dried under vacuum at 40° C. The product consists of 3-aminobenzene-sulphon-N-(gamma-chloro-beta-hydroxypropyl)amide hydrochloride of melting point 172° C.

EXAMPLE 4

7.74 parts of 3-aminobenzene-sulphon-N-(gamma-chloro-beta-hydroxypropyl)anilide are stirred with 65 parts of water and 5 parts of aqueous hydrochloric acid of specific gravity 1.16 at 5° C. A solution of 1.4 parts of sodium nitrite in 10 parts of water is added during 15 minutes. The diazo compound so obtained is added during 20 minutes to a solution, cooled to 5° C., of 6.1 parts of the sodium salt of 1-(4'-sulphophenyl)-3-methyl-5-pyrazolone and 3.2 parts of sodium bicarbonate in 50 parts of water. The mixture is stirred for 2 hours at 5° C. and sodium chloride is then added at the rate of 100 grams for each liter and the precipitated dyestuff is filtered off and dried. It is obtained in the form of a yellow powder which dissolves readily in water to give a yellow solution. The organically combined chlorine content of the product corresponds to 0.985 atom of chlorine per azo link. The product colors cellulosic textile materials in yellowish shades very fast to washing when applied in conjunction with an alkali.

OTHER DYES FROM DIAZOTIZED 3-AMINOBENZENE-SULPHON - N - (GAMMA - CHLORO-BETA-HYDROXY-PROPYL)ANILIDE

| Coupling component | Combined chlorine per azo link, atoms | Shade |
| --- | --- | --- |
| 1-acetylamino-8-hydroxy-naphthalene-3:6-disulphonic acid. | 0.95 | Red. |
| 2-amino-8-hydroxynaphthalene-6-sulphonic acid (acid coupled). | 0.99 | Red. |

The 3-aminobenzene-sulphon-N-(gamma-chloro-beta-hydroxypropyl)anilide may be obtained as follows:

84 parts of 3-nitrobenzene-sulphonanilide, 90 parts of epichlorhydrin and 0.5 parts of piperidine are stirred together at from 95 to 100° C. for 5 hours. The crude reaction mixture is dissolved in 100 parts of benzene and 200 parts of petroleum ether having a boiling range of 60 to 80° C. are added to the solution; the precipitated oil is separated off and dried under vacuum. The crude oil thus obtained is dissolved in 100 parts of chloroform and the solution shaken with 100 parts of hydrochloric acid of specific gravity 1.16. The chloroform layer is separated off, washed acid-free with water and evaporated to dryness under vacuum to give 3-nitrobenzene-sulphon-N-(gamma-chloro-beta-hydroxypropyl)anilide as a brown oil. This oil is dissolved in 500 parts of ethyl alcohol and 10 parts of finely divided nickel are added. The mixture is then heated for 6 hours at from 45 to 50° C. in an autoclave with hydrogen at 100 atmospheres pressure, and cooled. The suspended nickel is removed by filtration and the filtered solution is evaporated to dryness under vacuum. The residue is dissolved in 350 parts of chloroform and hydrochloric acid gas is passed into the cooled solution, at between 0 and 10° C., until no further precipitate is formed. The precipitate is filtered off, washed with chloroform and dried under vacuum at 40° C. The product consists of 3-amino-benzene-sulphon-N-(gamma-chloro-beta-hydroxypropyl)anilide as a white powder of melting point 180° C.

EXAMPLE 5

If the 6 parts of 4-aminobenzene-sulphon-N-(gamma-chloro-beta-hydroxypropyl)amide hydrochloride used in Example 2 are replaced by 7.8 parts of 4-aminobenzene-sulphon-N-(gamma-bromo-beta-hydroxypropyl)amide hydrobromide (prepared in an analogous manner to the chloro-analogue), a similar series of dyestuffs is obtained.

EXAMPLE 6

3.5 parts of orthanilic acid are diazotized in known manner and the diazo suspension is neutralized and added to a solution, cooled below 5° C., of 6.3 parts of 2-naphthol - 6 - sulphon - N - (gamma - chloro - beta-hydroxypropyl)amide and 2.5 parts of sodium carbonate in 100 parts of water. The mixture is stirred for 3 hours at 5° C. and sodium chloride is then added at the rate of 200 grams for each litre. The precipitated dyestuff is filtered off and dried. It is obtained in the form of an orange powder which dissolves readily in water and colors cellulosic textile materials in orange shades very fast to washing when applied in conjunction with an alkali.

The 2 - naphthol - 6 - sulphon - N - (gamma - chloro-beta-hydroxypropyl)amide used in the example may be obtained as follows:

29 parts of 2-hydroxy-6-chlorosulphonyl-1-naphthoic acid, in the form of a wet paste, are dissolved in 800 parts of acetone and 100 parts of water and the solution is stirred at below 5° C. 15 parts of 3-chloro-2-hydroxypropylamine hydrochloride and 34 parts of sodium bicarbonate are added and the mixture is stirred at below 10° C. for 4 hours. The bulk of the acetone is removed by evaporation at between 20 and 30° C. The thick paste thus obtained is stirred with 300 parts of water and the resultant solution is acidified with 20 parts of hydrochloric acid of specific gravity 1.16. The solid product is filtered off, washed acid free with water and dried under vacuum at 40° C. There is thus obtained 2 - hydroxy - 6 - (N - gamma - chloro - beta-hydroxypropyl)sulphamyl-1-naphthoic acid as a fawn colored powder of melting point 148° C. with decomposition. 25 parts of this product, 54 parts of water, 50 parts of acetone and 36 parts of hydrochloric acid of specific gravity 1.16 are boiled under reflux for 12 hours. The mixture is cooled, the precipitated product is filtered off, washed with 250 parts of 0.1% sodium carbonate solution and dried under vacuum at 40° C. The product consists of 2-naphthol-6-N-(gamma-chloro-beta-hydroxypropyl)amide as a fawn colored powder of melting point 160° C.

EXAMPLE 7

Cotton is slop-padded in a solution of 4-aminobenzene-sulphon-gamma-chloro-beta-hydroxypropylamide hydrochloride, dried and then treated with 0.5% caustic soda solution saturated with salt and steamed for 1 minute. It is then rinsed and soaped as described in the first recipe of Example 1. The cotton is then immersed in a dilute solution of nitrous acid for 5 minutes, rinsed with water and immersed in an alkaline solution of 2-naphthol-6-sulphonic acid. A pink dyeing is obtained which has good fastness to washing.

EXAMPLE 8

100 parts of the sodium salt of copper phthalocyanine-tetra-4-sulphonic acid are heated in 950 parts of chlorosulphonic acid at 115° to 120° C. for 4 hours. The reaction mixture is cooled and drowned carefully into ice-water. The copper phthalocyanine sulphonchloride so obtained is filtered off and suspended in 2000 parts of ice-water and the pH of the mixture is adjusted to 7 by adding sodium bicarbonate.

67.2 parts of sodium bicarbonate are then added, followed by a solution of 29.2 parts of 3-chloro-2-hydroxypropylamine hydrochloride and 16.8 parts of sodium bicarbonate in 400 parts of water. The mixture is stirred for 16 hours, allowing the temperature to rise slowly to 20° C. during the first 2 to 3 hours. 180 parts of sodium chloride are then added and the precipitate is filtered off, washed free from alkali with 10% brine and dried at 40° C.

The product dissolves in water to a bright blue solution, and dyes cellulose materials by the methods described in Example 1 in redder shades than the product of Example 1. The dyeings have high fastness to chemicals, to light and to wet treatments.

Analysis of the product shows that it is a mixture having an average of 2.3 sodium sulphonate and 1.7 3'-chloro-2'-hydroxypropylsulphamyl groups for each copper phthalocyanine nucleus.

EXAMPLE 9

A moist paste of 1:4-di-(4'-phenylanilino)anthraquinone tetra sulphonyl chloride obtained by chlorosulphonation of 54 parts of 1:4-di-(4'-phenylanilino)anthraquinone as described below, is suspended in 2000 parts of water at 20° C. and 29.2 parts of 3-chloro-2-hydroxypropylamine hydrochloride are added to the stirred suspension. The pH of the suspension is then adjusted to 8.0 by the addition of 10% aqueous sodium carbonate solution and the mixture is stirred for 2 hours, during which time further additions of aqueous sodium carbonate are added to keep the pH of the mixture between 7.5 and 8. The mixture is then stirred for 16 hours and 330 parts of pyridine are added. After stirring for 2 hours, 200 parts of sodium chloride are added. Aqueous hydrochloric acid is then added until all the dyestuff is precipitated. The mixture is filtered and the filter cake is washed with 1000 parts of aqueous sodium chloride. The residue is suspended in 3000 parts of water at 40° C. and sodium bicarbonate is added until the pH of the suspension is 8. After 1 hour, 300 parts of sodium chloride are added and the suspension is filtered. The filter cake is washed with 500 parts of aqueous sodium chloride and dried at 20° to 25° C. under vacuo.

The new dyestuff is obtained as a dark green powder which dissolves in water to give a dull green solution and in concentrated sulphuric acid to give a blue solution. It gives green shades on cellulosic materials which have good fastness to light and to washing.

The 1:4-di-(4'-phenylanilino)anthraquinone tetrasulphonyl chloride used in the above example may be obtained by stirring 54 parts of 1:4-di-(4-phenylanilino)anthraquinone in 465 parts of chlorosulphonic acid at 0° to 5° C. for 2 hours, then for 20 hours at 18° to 20° C. and finally for 1 hour at 75° to 85° C. The solution is cooled to 20° C. and poured on to a stirred mixture of 1500 parts of ice and 150 parts of sodium chloride. The precipitate is filtered off and washed with ice cold water until the washings are only slightly acid.

If instead of 54 parts of 1:4-di-(4'-phenylanilino)anthraquinone in the above example there is used 57 parts of 1:4-di-(4'-phenoxyanilino)anthraquinone then a dyestuff is obtained as a dark green powder which dissolves readily in water to give a bluish green solution and in concentrated sulphuric acid to give a blue solution. It gives dull bluish shades on cellulosic materials which are fast to washing.

What we claim is:
1. Process for the coloration of cellulose textile materials which comprises treating the said materials with a water-soluble compound having the formula:

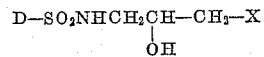

wherein
D represents a water-soluble dyestuffs chromophoric radical selected from the group consisting of azo, anthraquinone, and phthalocyanine water-soluble dyestuffs chromophoric radicals, having at least one water solubilizing group selected from the group consisting of sulfonic acid and carboxylic acid groups; and
X stands for a halogen atom selected from the group consisting of chlorine and bromine;

in an aqueous medium, and with an alkali compound, whereby said water-soluble compound chemically reacts with said textile material and becomes affixed thereto.

2. Process for the coloration of cellulose textile materials which comprises treating the said materials with a water-soluble compound having the formula:

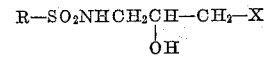

wherein
R is a radical selected from the group consisting of benzene and naphthalene radicals having a substituent selected from the group consisting of diazotizable primary amino, aromatic hydroxyl and ketonic enolizable groups, and
X is selected from the group consisting of chlorine and bromine;

in an aqueous medium, and with an alkali compound, whereby said water-soluble compound chemically reacts with said textile material and becomes affixed thereto; and thereafter converting said water-soluble compound in situ on the textile material to a chromophoric dyestuffs compound by a diazonium coupling reaction.

3. Cellulose materials reactively colored with a water-soluble dyestuffs compound having the formula:

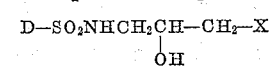

wherein
D represents a water-soluble dyestuffs chromophoric radical selected from the group consisting of azo, anthraquinone, and phthalocyanine water-soluble dyestuffs chromophoric radicals; having at least one water solubilizing group selected from the group consisting of sulfonic acid and carboxylic acid groups; and
X stands for a halogen atom selected from the group consisting of chlorine and bromine.

References Cited in the file of this patent
UNITED STATES PATENTS

| | | |
|---|---|---|
| 1,886,480 | Haller et al. | Nov. 8, 1932 |
| 2,131,712 | Schoeller et al. | Sept. 27, 1938 |
| 2,139,787 | Wingler et al. | Dec. 13, 1938 |
| 2,309,176 | Dreyfus | Jan. 26, 1943 |
| 2,364,033 | Woodward | Nov. 28, 1944 |
| 2,390,113 | McNally et al. | Dec. 4, 1945 |
| 2,402,538 | Dreyfus | June 25, 1946 |
| 2,564,243 | Beech et al. | Aug. 14, 1951 |
| 2,670,265 | Heyna et al. | Feb. 23, 1954 |
| 2,700,686 | Dickey et al. | Jan. 25, 1955 |
| 2,766,231 | Bolliger | Oct. 9, 1956 |
| 2,880,052 | Conciatori et al. | Mar. 31, 1959 |
| 2,892,829 | Stephen | June 30, 1959 |
| 3,053,849 | Clark et al. | Sept. 11, 1962 |
| 3,053,850 | Clark et al. | Sept. 11, 1962 |
| 3,084,166 | Booth et al. | Apr. 2, 1963 |